US010974962B2

(12) United States Patent
Nandi et al.

(10) Patent No.: US 10,974,962 B2
(45) Date of Patent: Apr. 13, 2021

(54) METHOD FOR PRODUCING METAL NITRIDES AND METAL CARBIDES

(71) Applicant: ExxonMobil Chemical Patents Inc., Baytown, TX (US)

(72) Inventors: Partha Nandi, Annandale, NJ (US); Quddus A. Nizami, Spring, TX (US); Christine E. Kliewer, Clinton, NJ (US); Andrew J. Stella, Cambridge, MA (US); Jihad M. Dakka, Whitehouse Station, NJ (US); Himanshu Gupta, Lebanon, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/335,366

(22) PCT Filed: Sep. 12, 2017

(86) PCT No.: PCT/US2017/051054
§ 371 (c)(1),
(2) Date: Mar. 21, 2019

(87) PCT Pub. No.: WO2018/067276
PCT Pub. Date: Apr. 12, 2018

(65) Prior Publication Data
US 2019/0284051 A1    Sep. 19, 2019

Related U.S. Application Data

(60) Provisional application No. 62/404,318, filed on Oct. 5, 2016.

(30) Foreign Application Priority Data

Nov. 30, 2016   (EP) ..................................... 16201323

(51) Int. Cl.
*C01B 21/06*      (2006.01)
*B01J 27/22*      (2006.01)
*B01J 27/24*      (2006.01)
*C10G 49/04*      (2006.01)
*C01B 32/914*     (2017.01)
*B01J 37/04*      (2006.01)
*B01J 37/08*      (2006.01)
*C01B 32/907*     (2017.01)
*C01B 32/949*     (2017.01)

(52) U.S. Cl.
CPC ............ *C01B 21/062* (2013.01); *B01J 27/22* (2013.01); *B01J 27/24* (2013.01); *B01J 37/04* (2013.01); *B01J 37/08* (2013.01); *C01B 21/0615* (2013.01); *C01B 21/0622* (2013.01); *C01B 32/907* (2017.08); *C01B 32/914* (2017.08); *C01B 32/949* (2017.08); *C10G 49/04* (2013.01); *C01P 2002/72* (2013.01); *C01P 2002/82* (2013.01); *C01P 2004/03* (2013.01); *C01P 2004/04* (2013.01)

(58) Field of Classification Search
CPC ......... C10G 45/04–06; C10G 49/02–04; B01J 27/22; B01J 27/24; C01B 21/0615; C01B 21/0622; C01B 32/949
See application file for complete search history.

(56) References Cited

U.S. PATENT DOCUMENTS

| | | | |
|---|---|---|---|
| 4,883,559 A | 11/1989 | Bamberger | |
| 5,200,060 A * | 4/1993 | Sajkowski | ............... B01J 27/22 208/108 |
| 5,443,560 A | 8/1995 | Deevi et al. | |
| 7,390,920 B2 | 6/2008 | Coleman et al. | |
| 2007/0284289 A1 | 12/2007 | Rodrigues et al. | |
| 2007/0286781 A1 * | 12/2007 | Rodrigues | .............. B01J 23/002 423/1 |
| 2015/0307536 A1 * | 10/2015 | Vogt | .................... C01B 21/0615 544/181 |

FOREIGN PATENT DOCUMENTS

| WO | 00/41404 A | 7/2000 |
|---|---|---|
| WO | 2014/027096 A | 2/2014 |

OTHER PUBLICATIONS

Alexander et al., "Alternative catalytic materials: carbides, nitrides, phosphides and amorphous boron alloys", Chem. Soc. Rev., 2010, vol. 39, pp. 4388-4401.
Aparicio et al., "Thermal decomposition of Prussian blue under inert atmosphere", J. Therm. Anal. Calorim. (2012), vol. 110, pp. 661-669.
Becker et al., "Highly Conformal Thin Films of Tungsten Nitride Prepared by Atomic Layer Deposition from a Novel Precursor", Chem. Mater., 2003, vol. 15, pp. 2969-2976.
Braga et al., Quantitative Determination of the Band Gap of $WS_2$ with Ambipolar Ionic Liquid-Gated Transistors,Nano Letters, 2012, vol. 12, pp. 5218-5223.
Chen, "Carbide and Nitride overlayers Overlayers on Early Transition Metal Surfaces: Preparation, Characterization, and Reactivities", Chem. Rev., 1996, vol. 96, pp. 1477-1498.
Desmoulins-Krawiec et al., "Synthesis of nanostructured materials in supercritical ammonia: nitrides, metals and oxides", J. Mater. Chem., 2004, vol. 14, pp. 228-232.
Hargreaves et al., "A comparison of the reactivity of lattice nitrogen in $CO_3Mo_3N$ and $Ni_2Mo_3N$ catalysts", Journal of Molecular Catalysis A: Chemical, vol. 35, (2009), pp. 12-129.

(Continued)

*Primary Examiner* — Renee Robinson

(57) ABSTRACT

A method for producing a metal nitride and/or a metal carbide, a metal nitride and/or metal carbide optionally produced according to the method, and the use of the metal nitride and/or carbide in catalysis optionally catalytic hydroprocessing. Optionally, the method comprises: i) contacting at least one metal oxide comprising at least one first metal $M^1$ with a cyanometallate comprising at least one second metal $M^2$ to form a reaction mixture; and, ii) subjecting the reaction mixture to a temperature of at least 300° C. for a reaction period. Optionally, the metal nitride and/or metal carbide is a metal nitride comprising tungsten nitride.

18 Claims, 5 Drawing Sheets

(56) References Cited

OTHER PUBLICATIONS

Hunter et al., "Topotactic Nitrogen Transfer: Structural Transformation in Cobalt Molybdenum Nitrides", Chem. Mater., 2010, vol. 22, pp. 2998-2907.

Jang et al., "Platinum-free tungsten carbides as an efficient counter electrode for dye sensitized solar cells", Chem. Commun., 2010, vol. 46, pp. 8600-8602.

Liu et al., "Structural and Electrochemical Studies of Pt Clusters Supported on High-Surface-Area Tungsten Carbide for Oxygen Reduction", ACS Catalysis, 2011, vol. 1, pp. 212-220.

Mckay et al., "Towards nitrogen transfer catalysis: reactive lattice nitrogen in cobalt molybdenum nitride", Chem. Commun., 2007, pp. 3051-3053.

Nandi et al., "Atomic Layer Deposited Molybdenum Nitride Thin Film: A Promising Anode Material for Li Ion Batteries", ACS Appl. Mater. Interfaces, 2014, vol. 6, pp. 6606-6615.

Polcar et al., "Tribological characterization of tungsten nitride coatings deposited by reactive magnetron sputtering", WEAR 262, (2007), pp. 655-665.

Wriedt, "The N-W (Nitrogen-Tungsten) System", Bulleting of Alloy Phase Diagrams, vol. 10, No. 4, 1989, pp. 358-367.

Xiao et al., "Core-Shell Bimetallic Carbide Nanoparticles Confined in a Three-Dimensional N-Doped Carbon Conductive Network for Efficient Lithium Storage", ACS Nano, vol. 8, No. 8, 2014, pp. 7846-7857.

Yan et al., "Small-sized and high-dispersed WN from $[SiO_4(W_3O_9)_4]^{4-}$ clusters loading on GO-derived graphene as promising carriers for methanol electro-oxidation", Energy Environ. Sci., 2014, vol. 7, pp. 1939-1949.

Nandi et al., Atomic layer deposited tungsten nitride thin films as new lithium-ion battery anode, Phys. Chem. Chem. Phys., 2015, vol. 17, pp. 17445-17453.

Zakaria, "Nanostructuring of Nanoporous iron carbide spheres via thermal degradation of triple-shelled Prussian blue hollow spheres for oxygen reduction reaction", RSC Adv., 2016, vol. 6, pp. 10341-10351.

\* cited by examiner

METHOD FOR PRODUCING METAL NITRIDES AND METAL CARBIDES

CROSS-REFERENCE TO RELATED APPLICATIONS

This application is a National Phase Application of PCT Application Serial No. PCT/US2017/051054, filed Sep. 12, 2017, which claims the benefits of and priorities to U.S. Provisional Application Ser. No. 62/404,318, filed Oct. 5, 2016, and European Application No. 16201323.9, filed Nov. 30, 2016, the disclosures of which are incorporated by reference in their entireties.

FIELD OF THE INVENTION

The present invention concerns a method for producing a metal nitride and/or a metal carbide, a metal nitride and/or carbide so produced, and the use of such a metal nitride and/or carbide in catalysis. More particularly, but not exclusively, this invention concerns a method for producing metal nitrides and/or metal carbides from at least one metal oxide and at least one cyanometallate.

BACKGROUND OF THE INVENTION

Metal nitrides and metal carbides are sought-after materials for a variety of applications. In particular, metal nitrides and metal carbides are useful in catalytic hydroprocessing. Alexander and Hargreaves, Chem. Soc, Rev., 2010, 39, 4388-4401, discloses that the catalytic behaviour of molybdenum- and tungsten-containing metal nitrides and carbides has been the focus of much attention because of analogy between their catalytic behaviour and that of noble metals. Tungsten nitride ($W_2N$) has been applied in hydroprocessing catalysis (J. G. Chen, Chem. Rev. 1996, 96, 1477-1498), catalytic oxidation and catalytic oxygen reduction reaction (ORR) (H. J. Yan, C. G. Tian, L. Sun, B. Wang, L. Wang, J. Yin, A. P. Wu, H. G. Fu, Energy Environ. Sci., 2014, 7, 1939-1949; Y. Liu, W. E. Mustain, ACS Catal. 2011, 1, 212-220; D. Braga, I. G. Lezama, H. Berger, A. F. Morpurgo, Nano Lett., 2012, 12, 5218-5223; J. S. Jang, D. J. Ham, E. Ramasamy, J. Lee, J. S. Lee, Chem. Commun. 2010, 46, 8600-8602). Metal nitrides and carbides also have useful applications in areas other than catalysis. For example, Xiao et al., ACS Nano, 2014, 8, 7846-7857, discloses that transition metal carbides show an unusual combination of outstanding properties, such as high melting point, high electrical and thermal conductivities, exceptional hardness, excellent mechanical stability, and chemical stability along with high corrosion resistance under reaction conditions. Tungsten nitride coating on steel can significantly reduce corrosion and wear due to its exceptional mechanical strength (Wear, 2007, 262, 655-665). Tungsten nitride can also function as a useful precursor to unique kinetically stable tungsten carbide phases because transformation of tungsten nitride to carbide is topotactic (Chem. Soc. Rev., 2010, 39, 4388-4401). Metal nitrides also offer unique reactivity; for example, the prospect of lattice nitrogen of nitrides as reactive species has been shown for mixed metal nitrides such as $Co_3Mo_3N$ (S. M. Hunter, D. Mckay, R. I. Smith, J. S. J. Hargreaves and D. H. Gregory, Chem. Mater., 2010, 22, 2898-2907, D. Mckay, D. H. Gregory, J. S. J. Hargreaves, S. M. Hunter and X.-L. Sun, Chem. Commun., 1997, 3051-3053), where up to 50% nitrogen can be reversibly added and lost from the lattice. This reversible addition of nitrogen in nitrides is highly composition and phase dependent. For example $Fe_3Mo_3N$ and $Ni_2Mo_3N$ are not as effective as N atom carriers (J. S. J. Hargreaves and D. Mckay, J. Mol. Catal. A: Chem., 2009, 305, 125-129). Having synthetic control over the composition and phase of these mixed metal nitrides is therefore desirable.

Conventional synthetic methods for making nitrides involve a high temperature reaction (typically 800° C. or above) of metal precursors with ammonia via gas-solid reactions or by vapour deposition of metal salt precursors. Wriedt, Bull. of Alloy Phase Diagr., 1989, 10(4), 358-67, discloses methods of making tungsten nitrides by contacting tungsten films with ammonia at high temperatures. Nandi et al. ACS Appl. Mater. Interfaces, 2014, 6, 6606-6615 discloses atomic layer deposition of molybdenum nitride films. Atomic layer deposition of tungsten nitride films is disclosed in Chem. Mater, 2003, 15, 2969-2976, WO00/41404 (Gelest) and Phys. Chem. Chem. Phys., 2015, 17, 17445-17453. Deposition of tungsten nitride coatings by reactive magnetron sputtering is disclosed in Wear, 2007, 262, 655-665. Such methods typically provide materials with a relatively low surface area and the harsh conditions prevent accurate control of particle size. Furthermore, it is often difficult or impossible to make mixed metal nitrides by such methods. Recently, Xiao et al., ACS Nano, 2014, 8, 7846-7857, disclosed a method of making porous $Co_3ZnC$ nanoparticles by annealing $Zn_3[Co(CN)_6]_2$/polyvinylpyrrolidone nanosphere precursors under a nitrogen atmosphere at a temperature of 600° C. A method of making iron carbide is by thermal decomposition of "Prussian Blue" ($Fe_4[Fe(CN)_6]_3$) (Aparicio, C., Machala, L. & Marusak, Z., J. Therm. Anal. calorim. 2012, 110, 661; Mohamed B. Zakaria, RSC Adv., 2016, 6, 10341). Similar approaches to making metal nitrides are not known. Certain metal nitrides have been prepared at low temperature with the use of supercritical ammonia (J. Mater. Chem., 2004, 14, 228-32), but the process requires a very high pressure and specialised equipment.

There remains a need for a low temperature, low cost and generalised synthetic route to making a variety of metal nitrides and carbides that does not require the use of specialist and/or complicated process equipment. More particularly, there remains a need for a convenient route to making metal nitrides and carbides from readily available staring materials.

SUMMARY OF THE INVENTION

The present invention provides, according to a first aspect, a method for producing a metal nitride and/or a metal carbide, the method comprising: i) contacting at least one metal oxide comprising at least one first metal $M^1$ with a cyanometallate comprising at least one second metal $M^2$ to form a reaction mixture; and, ii) subjecting the reaction mixture to a temperature of at least 300° C. for a reaction period. Optionally, the method is a method for producing a metal nitride. Optionally, the method is a method for producing a metal carbide.

The present inventors have surprisingly found that heating a mixture of a metal oxide and a cyanometallate to a temperature of at least 300° C. provides a particularly convenient and efficient method of making a metal nitride and/or a metal carbide from readily available, relatively inexpensive precursors. In particular, the present inventors have found that the process of the present invention can be used to produce metal nitrides and/or metal carbides under relatively mild reaction conditions. Furthermore, the process of the first aspect of the present invention provides a tuneable method of making a variety of different metal nitrides and/or metal carbides, for example by the use of different metal oxide and cyanometallate precursors.

According to a second aspect, the present invention provides a metal nitride and/or carbide comprising: a) a first metal nitride and/or carbide selected from the list consisting of: iron nitride, iron carbide, cobalt nitride and cobalt carbide; and b) a second metal nitride and/or carbide selected from the list consisting of: tungsten nitride, tungsten carbide, rhenium nitride and rhenium carbide. Optionally, the metal nitride and/or metal carbide comprises tungsten nitride and at least one of iron nitride and iron carbide, for instance tungsten nitride, iron nitride and iron carbide, e.g. $W_2N$, $Fe_4N$ and $Fe_3C$. It may be that such metal nitrides and/or carbides are particularly useful as catalysts, and/or can be prepared by a particularly convenient route from readily available and relatively low-cost starting materials.

According to a third aspect, the present invention provides a metal nitride and/or a metal carbide prepared by the method according to the first aspect of the invention, optionally wherein the metal nitride and/or metal carbide is a metal nitride and/or metal carbide according to the second aspect of the invention.

According to a fourth aspect, the present invention provides a use of the metal nitride and/or metal carbide of the second or third aspect as a catalyst.

DETAILED DESCRIPTION OF THE INVENTION

Figure 1:
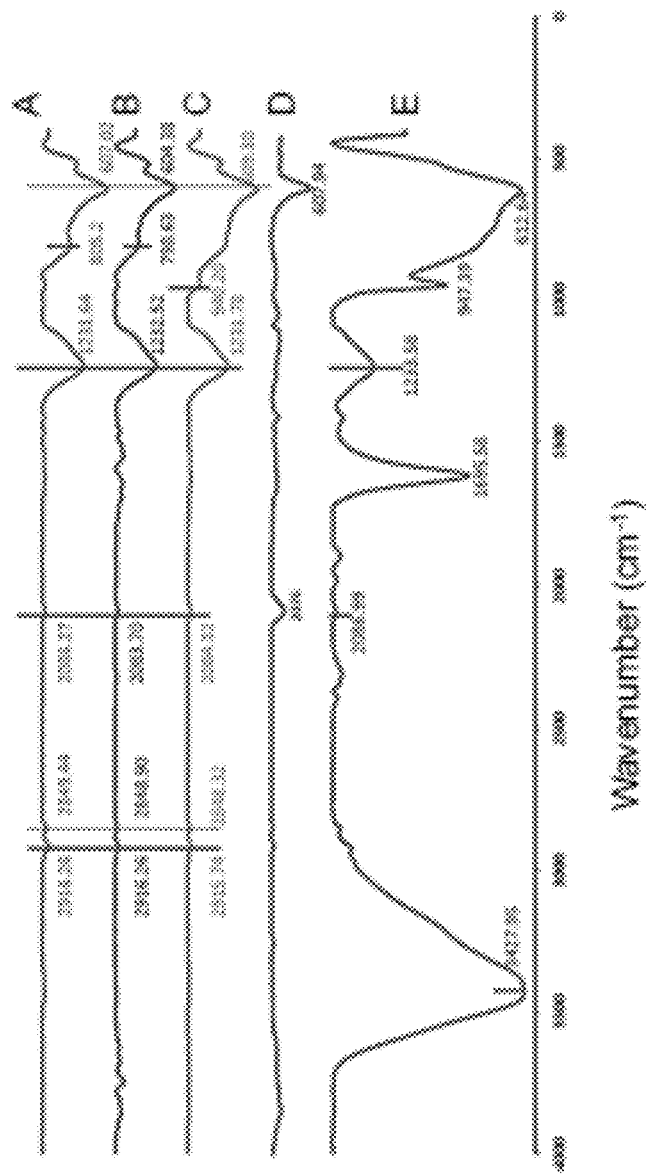
FIG. 1 shows infrared (IR) spectra of cyanometallate and metal oxide precursors and reaction mixtures following heating at various temperatures for various periods.

In the present invention, the metal oxide comprises at least one first metal $M^1$. Conveniently, $M^1$ is a transition metal. As used here, the term "transition metal" refers to an element in the d- or f-block of the Periodic Table of the Elements, including elements in Groups 3 to 12 of the Period Table of the Elements, and the elements of the lanthanide series and the actinide series. $M^1$ may for instance be a transition metal selected from the d-block of the Periodic Table of the Elements, preferably selected from Groups 5, 6 or 7 of the Periodic Table of the Elements such as selected from the list consisting of vanadium (V), niobium (Nb), tantalum (Ta), chromium (Cr), molybdenum (Mo), tungsten (W), manganese (Mn), technetium (Tc) and rhenium (Re). It may be that metal oxides comprising at least one first metal $M^1$ that is a transition metal selected from Group 5, 6 or 7 react particularly well with cyanometallates in the process of the invention. $M^1$ can for example be selected from the list consisting of niobium (Nb), molybdenum (Mo), tungsten (W), and rhenium (Re). It may be that when $M^1$ is Nb, Mo, W or Re, the reaction between the metal oxide and the cyanometallate proceeds particularly efficiently. In a particular embodiment, $M^1$ may be tungsten (W) or rhenium (Re), more particularly tungsten (W). It may be that when $M^1$ is W or Re, the resulting metal nitride and/or carbide is particularly useful, for example in catalysis. In that particular embodiment, the metal oxide may comprise $WO_3$, in particular tungstic acid, and/or $Re_2O_7$, in particular perrhenic acid. It may be that $WO_3$, in particular tungstic acid, and $Re_2O_7$, in particular perrhenic acid, react readily with the cyanometallate to produce tungsten- and/or rhenium-containing metal nitrides and/or metal carbides. In a further particular embodiment, the metal oxide may comprise $WO_3$, in particular tungstic acid.

The cyanometallate used in the present invention may comprise a dicyanometallate, a tetracyanometallate, a hexacyanometallate, and/or an octacyanometallate, preferably a tetracyanometallate and/or a hexacyanometallate. Preferably, the cyanometallate is a hexacyanometallate. It will be appreciated that a dicyanometallate comprises a metal centre coordinated to two cyanide ligands, a tetracyanometallate comprises a metal centre coordinated to four cyanide ligands, a hexacyanometallate comprises a metal centre coordinated to six cyanide ligands, and an octacyanometallate comprises a metal centre coordinated to eight cyanide ligands. It may be that tetracyanometallates and/or hexacyanometallates, for example especially hexacyanometallates, offer a particularly efficient and convenient cyanometallate precursor for use in the process of the present invention. Preferably, when the cyanometallate comprises a dicyanometallate, dicyanometallate comprises copper (Cu), silver (Ag) or gold (Au). Preferably, when the cyanometallate comprises a tetracyanometallate, the tetracyanometallate comprises nickel (Ni), palladium (Pd) and/or platinum (Pt). Preferably, when the cyanometallate comprises a hexacyanometallate, the hexacyanometallate comprises titanium (Ti), vanadium (V), chromium (Cr), manganese (Mn), iron (Fe), and/or cobalt (Co). Preferably, when the cyanometallate comprises octacyanometallate, the octacyanometallate comprises molybdenum (Mo).

Preferably, the cyanometallate comprises a material having the formula $M^3{}_x[M^2(CN)_y]_z$, wherein $M^2$ and $M^3$ are the same or different metals, in particular wherein x is an integer from 1 to 4, in particular 1 or 4, preferably y is 4 or 6, and preferably z is an integer from 1 to 3, in particular 1 or 3. Optionally, x is 1, z is 1, and y is 6. Optionally, x is 4, z is 3, and y is 6. Conveniently, $M^2$ is a transition metal. $M^2$ may for instance be selected from Groups 8 and 9 of the Periodic Table of the Elements, such as from the list consisting of iron (Fe) and cobalt (Co), in particular from Fe(II), Fe(III) and Co(III). Especially advantageous cyanometallate anions are of formula $[Fe(II)(CN_6)]^{4-}$, $[Fe(III)(CN)_6]^{3-}$, and $[Co(III)(CN)_6]^{3-}$. Without wishing to be bound by theory, the present inventors believe that the process of the present invention works well with cyanometallates comprising a wide variety of different metals as the metal $M^3$, including, for example, cyanometallates in which $M^3$ is an alkali metal, an alkaline earth metal, a transition metal, a rare earth metal (i.e. a metal from the lanthanide or actinide series), or a post-transition metal of Groups 13 to 16 of the Periodic Table of the Elements, preferably cyanometallates wherein the metal $M^3$ is an alkali metal, a transition metal, a rare earth metal from the lanthanide series or a post-transition metal of Group 13 of the Periodic Table of the Elements. It will be appreciated that post-transition metals are metallic elements located between the transition metals and the metalloids of the Period Table of the Elements, for example including aluminium (Al), gallium (Ga), indium (In), thallium (Tl), germanium (Ge), tin (Sn), lead (Pb), antimony (Sb), and bismuth (Bi). $M^3$ may for instance be selected from the list consisting of potassium (K), iron (Fe), cobalt (Co), yttrium (Y), aluminium (Al), gallium (Ga), lanthanum (La), praseodymium (Pr), and dysprosium (Dy). Preferably, $M^3$ is K(I), Fe(III), Co(III), Y(III), Al(III), Ga(III), La(III), Pr(III) or Dy(III). Preferably, $M^3$ is a trivalent metal cation. As used herein, the term "trivalent metal cation" is a metal cation in the 3+ oxidation state. Conveniently, $M^3$ is a transition metal. $M^3$ may for instance be selected from Group 3, Group 8, Group 9 or the lanthanide series of the Periodic Table of the Elements. In a particular embodiment, $M^3$ may be Fe(III) or Co(III). In the present application, $M^2$ and $M^3$ may be the same or different, advantageously the same. Suitable examples of cyanometallate comprise $Fe_4[Fe(CN)_6]_3$, $K_3[Fe(CN)_6]$, $Y[Fe(CN)_6]$, $Al[Fe(CN)_6]$, $La[Fe(CN)_6]$, $Pr[Fe(CN)_6]$, $Dy[Fe(CN)_6]$, $Co[Co(CN)_6]$, $Y[Co(CN)_6]$, $Al[Co(CN)_6]$, $La[Co(CN)_6]$ and/or $K_3[Co(CN)_6]$, in particular $Fe_4[Fe(CN)_6]_3$ and/or $Co[Co(CN)_6]$.

In the method of the present invention, the molar ratio of metal oxide to cyanometallate in contacting step i) may range from 20:1 to 1:20, for example from 10:1 to 1:10, such as from 10:1 to 1:5, in particular from 10:1 to 1:1. Additionally or alternatively, the molar ratio of ratio $M^1:M^2+M^3$ in contacting step i) may range from 5:1 to 1:5, for example from 3:1 to 1:3, such as from 2:1 to 1:2, in particular about 1:1. It may be that a limited molar ratio helps to avoid undue wastage of excess material.

Optionally, the step of contacting the metal oxide with the cyanometallate to form the reaction mixture comprises forming an intimate mixture of the metal oxide and the cyanometallate. It may be that the formation of an intimate mixture of the metal oxide and the cyanometallate increases reaction efficiency and thus provides better conversion of said precursors to the desired metal nitride and/or metal carbide. Contacting of the at least one metal oxide and the cyanometallate may be conducted in the presence or absence of a solvent. If a solvent is present, it may typically be selected from water, organic solvents, and mixtures thereof, especially water. It will be appreciated that the use of water as a at least part of the solvent, or of no solvent, may offer a particularly environmentally friendly and relatively safe process for making a metal nitride and/or a metal carbide, for example through the use of less organic solvent.

For instance, in one embodiment, the cyanometallate and the metal oxide may be provided in solid form and contacting step i) of forming the reaction mixture may be carried out by dry mixing the cyanometallate and the metal oxide, for example wherein the cyanometallate and the metal oxide are provided in the form of crystals or powders. It will be appreciated that the term 'dry mixing' refers to a method in which the materials are mixed together substantially without the use of a solvent. It will also be appreciated that the term 'dry mixing' includes any mixing method for combining two solids without the use of a liquid solvent, and thus does not exclude, for example, the use of a solid material comprising a compound co-crystallised with a solvate. Suitable examples of dry mixing methods include milling (e.g. ball milling), as well as basic methods such as solid-solid mixing using a pestle and mortar.

In another embodiment, the cyanometallate and the metal oxide may be combined in the presence of a solvent. In particular, the cyanometallate used in the process of the present invention may be provided in the form of a cyanogel, wherein the cyanogel comprises a mixture of: a) the cyanometallate, and b) at least part of the solvent. As used herein, the term "cyanogel" means a mixture of a cyanometallate and a solvent, for example formed by combining the solvent and the cyanometallate (for example in the form of a powder), and stirring the resulting mixture. The mixing can be achieved using any suitable method, e.g. using a magnetic stirrer on a stir plate. It may be that the cyanogel is in the form of a solution, gel, or solid (e.g. a solid powder or crystalline material in which the solvent is taken up in the cyanometallate by sorption). It may be that when the cyanometallate is provided in the form of a cyanogel comprising a cyanometallate and at least part of the solvent, the step of forming the reaction mixture of the metal oxide and the cyanometallate can be carried out in a particularly efficient and straightforward manner. For example, it may be that the use of a cyanogel allows an especially intimate mixture of the cyanometallate and the metal oxide to be formed in the step of forming the reaction mixture. It will be appreciated that the use of a cyanogel comprising the cyanometallate and water may offer a particularly environmentally friendly and relatively safe process for making a metal nitride and/or a metal carbide, for example through the use of less organic solvent. In this particular embodiment, when the step of contacting the metal oxide with the cyanometallate to form the reaction mixture comprises forming an intimate mixture of the metal oxide and the cyanometallate, the cyanometallate is provided in the form of a cyanogel, preferably a cyanogel comprising a mixture of the cyanometallate and the solvent, and the metal oxide is preferably provided in the form of a solid such as crystals or powder. The mixing of the cyanogel and the metal oxide can be achieved using any suitable method, e.g. using ball-milling as well as a magnetic stirrer on a stir plate depending on the viscosity of the reaction mixture. Said mixing may optionally be conducted in the presence of a further amount of the solvent if the cyanogel only comprises a part thereof.

The process of the first aspect of the invention comprises subjecting the reaction mixture to a temperature of at least 300°C, preferably to a temperature equal to or higher than the decomposition temperature of the cyanometallate. As used herein, the "decomposition temperature" of a substance is the temperature at which the substance decomposes to form one or more chemically different species. For instance, the reaction mixture may be subjected to a temperature of at least 400° C., such as at least 500° C., in particular at least 600° C. Suitable temperature ranges may include a temperature of from 300 to 1000° C., such as 400 to 900° C., in particular 500 to 800° C., for instance 600 to 700° C. It may be that higher temperatures facilitate a faster reaction between the cyanometallate and the metal oxide. It may be that the temperature that the reaction mixture is subjected to is a balance between providing an efficient reaction speed and avoiding unwanted thermal decomposition of the nitride and/or carbide product. It may also be that the temperature that the reaction mixture is subjected to is a balance between providing an efficient reaction speed and avoiding the need for costly specialised equipment.

The reaction period is typically up to 48 hours, such as up to 24 hours, in particular up to 12 hours. For instance, the reaction period may be from 10 minutes to 48 hours, such as from 20 minutes to 24 hours, in particular from 30 minutes to 12 hours. It may be that the reaction period is a balance between allowing enough time for a reasonable amount of the desired metal nitride and/or metal carbide to form and preventing or reducing unwanted thermal decomposition of the desired metal nitride and/or metal carbide products and/or the metal oxide and/or cyanometallate precursors.

In a preferred embodiment of the third aspect of the invention, the metal nitride and/or metal carbide comprises a material selected from the list consisting of: tungsten nitride, molybdenum nitride, niobium nitride, rhenium nitride, tungsten carbide, molybdenum carbide, niobium carbide and rhenium carbide, in particular tungsten nitride or rhenium carbide. For instance, the metal nitride and/or metal carbide is a metal nitride, preferably tungsten nitride, e.g. $W_2N$. Optionally, the metal nitride and/or carbide is a metal carbide, preferably rhenium carbide. The metal nitride and/or metal carbide of the third aspect of the invention may also comprise at least two different metals, such as a first metal $M^1$ as defined in the first aspect of the present invention, in particular a first metal selected from the list consisting of W, Mo, Nb and Re, and a second metal $M^2$ as defined in the first aspect of the present invention, in particular a second metal selected from the list consisting of Fe and Co. For example, the metal nitride and/or metal carbide of the third aspect of the invention may comprise at least one of a) an iron nitride and/or carbide, or a cobalt nitride and/or carbide, in particular iron nitride and/or carbide; and at least one of b) a tungsten, molybdenum, niobium or rhenium nitride and/or carbide, especially tungsten nitride or rhenium carbide, in particular tungsten nitride. In a further particular embodiment, the metal nitride and/or metal carbide of the second or third aspect of the invention comprises tungsten nitride and at least one of iron nitride and iron carbide, for instance tungsten nitride, iron nitride and iron carbide, e.g. $W_2N$, $Fe_4N$ and $Fe_3C$. It may be that such metal nitrides and/or carbides are particularly useful as catalysts, and/or can be prepared by a particularly convenient route from readily available and relatively low-cost starting materials.

The metal nitride and/or metal carbide of the second or third aspect of the invention is typically in the form of a crystalline material or a powder.

Optionally, the metal nitride and/or metal carbide comprises $Fe_4N$ and a Powder X-Ray Diffraction pattern of the metal nitride and/or carbide includes peaks having the following 2-theta values: 23.45, 33.36, 41.17, 47.91, 53.99, 59.64, 70.06, 75.02, 79.87, 84.65, 94.03, 98.87 and 108.52, the Powder X-Ray Diffraction pattern being collected on a diffractometer using a Cu Kα, λ=1.5405 Å, radiation source within a range of 5°≤2θ≤70° using a step size of 0.02°, a counting time of 1 s/step, a ¼ angle incident slit, 45 kv, and a current of 40 mA.

Additionally or alternatively, the metal nitride and/or metal carbide optionally comprises $Fe_3C$ and a Powder X-Ray Diffraction pattern of the metal nitride and/or carbide includes peaks having the following 2-theta values: 26.19, 31.36, 33.93, 35.89, 41.78, 43.92, 47.05, 50.08, 53.89, 55.66, 59.18, 60.46, 61.80, 63.20, 67.31, 76.81, 79.87, 83.22, 86.90, 91.00 and 95.57, the Powder X-Ray Diffraction pattern being collected on a diffractometer using a Cu Kα, λ=1.5405 Å, radiation source within a range of 5°≤2θ≤70° using a step size of 0.02°, a counting time of 1 s/step, a ¼ angle incident slit, 45 kv, and a current of 40 mA.

Additionally or alternatively, the metal nitride and/or metal carbide comprises $W_2N$ and a Powder X-Ray Diffraction pattern of the metal nitride and/or carbide includes peaks having the following 2-theta values: 37.73, 43.85, 63.73, 76.51, 80.59, 96.68, 108.86 and 113.14, the Powder X-Ray Diffraction pattern being collected on a diffractometer using a Cu Kα, λ=1.5405 Å, radiation source within a range of 5°≤2θ≤70° using a step size of 0.02°, a counting time of 1 s/step, a ¼ angle incident slit, 45 kv, and a current of 40 mA.

According to the fourth aspect of the invention, the metal nitride and/or metal carbide of the present invention may be used to form (or as) a hydroprocessing catalyst. It will be appreciated that a hydroprocessing catalyst may, for example, be used in a variety of different hydroprocessing applications, for example hydrocracking, hydrodenitrogenation, hydrodesulfurization, hydrofining, hydroforming, hydrogenation and/or hydrotreating. Preferably, the catalyst is a hydrogenation, hydrodenitrogenation and/or hydrodesulfurization catalyst. It may be that a tungsten nitride-containing metal nitride catalyst is particularly useful as a hydroprocessing catalyst, for example as a hydrogenation, hydrodenitrogenation and/or hydrodesulfurization catalyst. For example, it may be that the catalyst is a catalyst for hydrogenolysis of a cycloparaffin.

It will of course be appreciated that features described in relation to one aspect of the present invention may be incorporated into other aspects of the present invention. For example, metal carbide and/or nitride of the second or third aspect of the invention may incorporate any of the features described with reference to the method of the first aspect of the invention and vice versa.

EXAMPLES OF THE INVENTION

The following examples illustrate the present invention. Numerous modifications and variations are possible and it is to be understood that within the scope of the appended claims, the invention may be practiced otherwise than as specifically described herein.

Powder XRD data were collected using an in situ PANalytical X-ray diffractometer under nitrogen and oxygen flow equipped with Cu Kα (λ=1.5405 Å) radiation within a range of 5°≤2θ≤70° (step size: 0.02°, counting time: 1 s/step, ¼ angle incident slit, 45 kv, and a current of 40 mA).

IR data were collected using a Vertex 80, Praying Mentis IR spectrometer in drift mode with 128 background scans, 128 sample scans, 64 good FW scans and 64 good BW scans.

"Prussian Blue" ($Fe_4[Fe(CN)_6]_3$) was obtained from Sigma-Adrich® as a dark blue/purple crystalline powder and used as such. The infrared spectrum of $Fe_4[Fe(CN)_6]_3$ is shown as trace D in FIG. 1. The Powder X-Ray Diffraction pattern of $Fe_4[Fe(CN)_6]_3$ is shown as trace D in FIG. 2.

Tungstic Acid ($H_2WO_4$) was obtained from Sigma-Aldrich® as a yellow-orange powder (99% purity) and used as such. The infrared spectrum of $H_2WO_4$ is shown as trace E in FIG. 1. The Powder X-Ray Diffraction pattern of $H_2WO_4$ is shown as trace E in FIG. 2.

Yttrium(III) nitrate hydrate ($Y(NO_3)_3 \cdot xH_2O$) and potassium hexacyanoferrate(II) ($K_3[Fe(CN)_6]$) were obtained from Signma-Aldrich®.

A typical procedure for preparation of a mixed transition metal cyanometallate is as follows: $Y(NO_3)_3 \cdot xH_2O$ (10 mmol) was added to a solution of $K_3[Fe(CN)_6]$ (10 mmol) in water (50 mL) resulting in a yellowish brown precipitate. The precipitate was collected by filtration and washed with water (20 mL) to remove coproduct $KNO_3$. The resulting solid was dried overnight at 120° C. to give $Y[Fe(CN)_6]$ in a ~75% yield. A sample of the $Y[Fe(CN)_6]$ product was tested by Powder X-Ray Diffraction to confirm its identity.

Unless otherwise stated, the cyanogels used in the following examples were prepared by combining the cyanometallate and the solvent (typically $Fe_4[Fe(CN)_6]_3$ and water) in a beaker and manually stirring the mixture.

Unless otherwise stated, the metal nitride/carbide samples produced in the following examples were obtained in the form of crystalline materials.

Ce/ZrO$_2$ (ceria-zirconia), sulphated ZrO$_2$ (sulphated zirconia) and W/ZrO$_2$ (tungstated zirconia) are Bronsted acidic supports obtained from commercial suppliers and used without modification.

Example 1

H$_2$WO$_4$ (5 g) and Fe$_4$[Fe(CN)$_6$]$_3$ (2.4 g) were combined together by solid-solid mixing using a pestle and mortar in a molar ratio of H$_2$WO$_4$ to Fe$_4$[Fe(CN)$_6$]$_3$ of 7:1 (giving a 1:1 molar ratio of W:Fe) to form an intimate solid mixture. A sample (2 g) of the resulting mixture was subjected to a temperature of 600° C. for one hour under a nitrogen atmosphere to form metal nitride/carbide sample X1a. The infrared spectrum of sample X1a is shown as trace C in FIG. 1. The sample X1a was then subjected to a temperature of 600° C. for a further 12 hours under a nitrogen atmosphere to form metal nitride/carbide sample X1b. The infrared spectrum of sample X1b is shown as trace B in FIG. 1. A further sample (2 g) of the mixture was subjected to a temperature of 750° C. for one hour under a nitrogen atmosphere to form metal nitride/carbide sample X2. The infrared spectrum of sample X2 is shown as trace A in FIG. 1.

The IR data presented in FIG. 1 show an absence of CN stretching frequency (the CN stretch frequency is around 2100 cm$^{-1}$) and W=O stretching frequency (the WO stretch frequency is around 950 cm$^{-1}$) as the Fe$_4$[Fe(CN)$_6$]$_3$ is heated with H$_2$WO$_4$ after solid-solid mixing, thereby showing transformation of the cyanometallate and metal oxide precursors into the desired metal nitride/carbide through at least partial disappearance of the CN and WO peaks. The new material formed is believed to be largely IR inactive.

Example 2

H$_2$WO$_4$ (5 g) and Fe$_4$[Fe(CN)$_6$]$_3$ (2.4 g) were combined together by solid-solid mixing using a pestle and mortar in a molar ratio of H$_2$WO$_4$ to Fe$_4$[Fe(CN)$_6$]$_3$ of 7:1 (giving a 1:1 molar ratio of W:Fe) to form an intimate solid mixture. A sample (2 g) of the resulting mixture was subjected to a temperature of 450° C. for one hour under a nitrogen atmosphere to form metal nitride/carbide sample X3. The Powder X-Ray Diffraction pattern of sample X3 is shown as trace C in FIG. 2. A further sample (2 g) of the mixture was subjected to a temperature of 600° C. for one hour under a nitrogen atmosphere to form metal nitride/carbide sample X4. The infrared spectrum of sample X4 is shown as trace B in FIG. 2. A further sample (0.1 g) of the mixture was subjected to a temperature of 750° C. for one hour under a nitrogen atmosphere to form metal nitride/carbide sample X5. The infrared spectrum of sample X5 is shown as trace A in FIG. 2.

Figure 2:
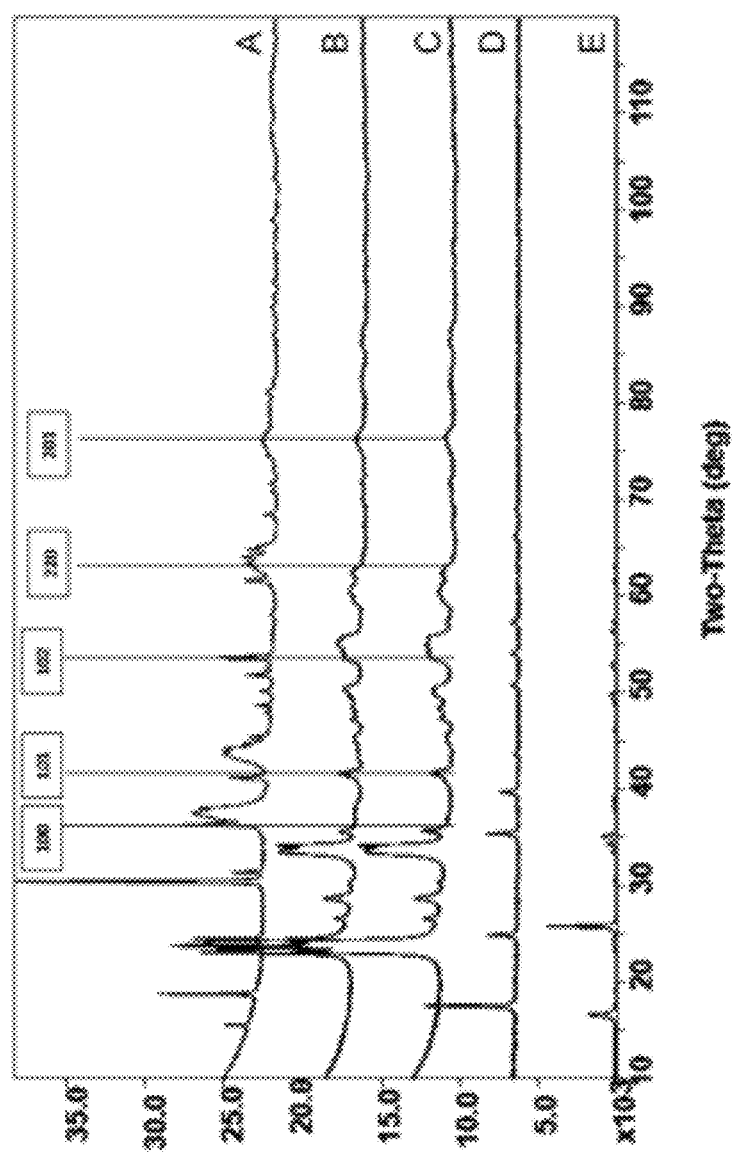
FIG. 2 shows Powder X-Ray Diffraction patterns of cyanometallate and metal oxide precursors and reaction mixtures following heating at various temperatures.

The peak indexing for tungsten nitride (W$_2$N) is indicated by the lines labelled 100, 101, 102, 220 and 201 in FIG. 2 (referenced with respect to data published in J. Mater. Chem., 2011, 21, 10761-66), showing that W$_2$N is present in samples X3 to X5. The samples X3 to X5 also contain other metal nitrides and metal carbides such as Fe$_4$N, C$_3$N$_4$, Fe$_3$C and Fe$_2$O$_3$. 2-Theta peak indexes for W$_2$N, Fe$_4$N and Fe$_3$C are listed in Table 1 (the product and by-products being identified by comparison to literature values for each individual species—W$_2$N: Fiala, Central Research Institute, SKODA, Czechoslovakia, Private Communication (1973); Fe$_4$N: Jack. Proc. R. Soc. London, Ser. A 195, 34 (1948); Fe$_3$C: Konobejewski. Z. Kristallogr., Kristallgeom., Kristallphys., Kristallchem. 72, 386 (1929)). Not all of the peaks listed in Table 1 are visible at the resolution of the Powder X-Ray Diffraction patterns shown in FIG. 2.

TABLE 1

X-Ray Powder Diffraction Peak Indexing for W$_2$N, Fe$_4$N and Fe$_3$C present in samples X3 to X5

| W$_2$N (2-theta) | Fe$_4$N (2-theta) | Fe$_3$C (2-theta) |
|---|---|---|
| 37.73 | 23.45 | 26.19 |
| 43.85 | 33.36 | 31.36 |
| 63.73 | 41.17 | 33.93 |
| 76.51 | 47.91 | 35.89 |
| 80.59 | 53.99 | 41.78 |
| 96.68 | 59.64 | 43.92 |
| 108.86 | 70.06 | 47.05 |
| 113.14 | 75.02 | 50.08 |
|  | 79.87 | 53.89 |
|  | 84.65 | 55.66 |
|  | 94.03 | 59.18 |
|  | 98.87 | 60.46 |
|  | 108.52 | 61.80 |
|  |  | 63.20 |
|  |  | 67.31 |
|  |  | 76.81 |
|  |  | 79.87 |
|  |  | 83.22 |
|  |  | 86.90 |
|  |  | 91.00 |
|  |  | 95.57 |

The Powder X-Ray Diffraction patterns of FIG. 2 show the transformation of the metal oxide and cyanometallate precursors into the metal nitrides and carbides after heating for a relatively short amount of time at moderate temperatures.

Example 3

Figure 3:
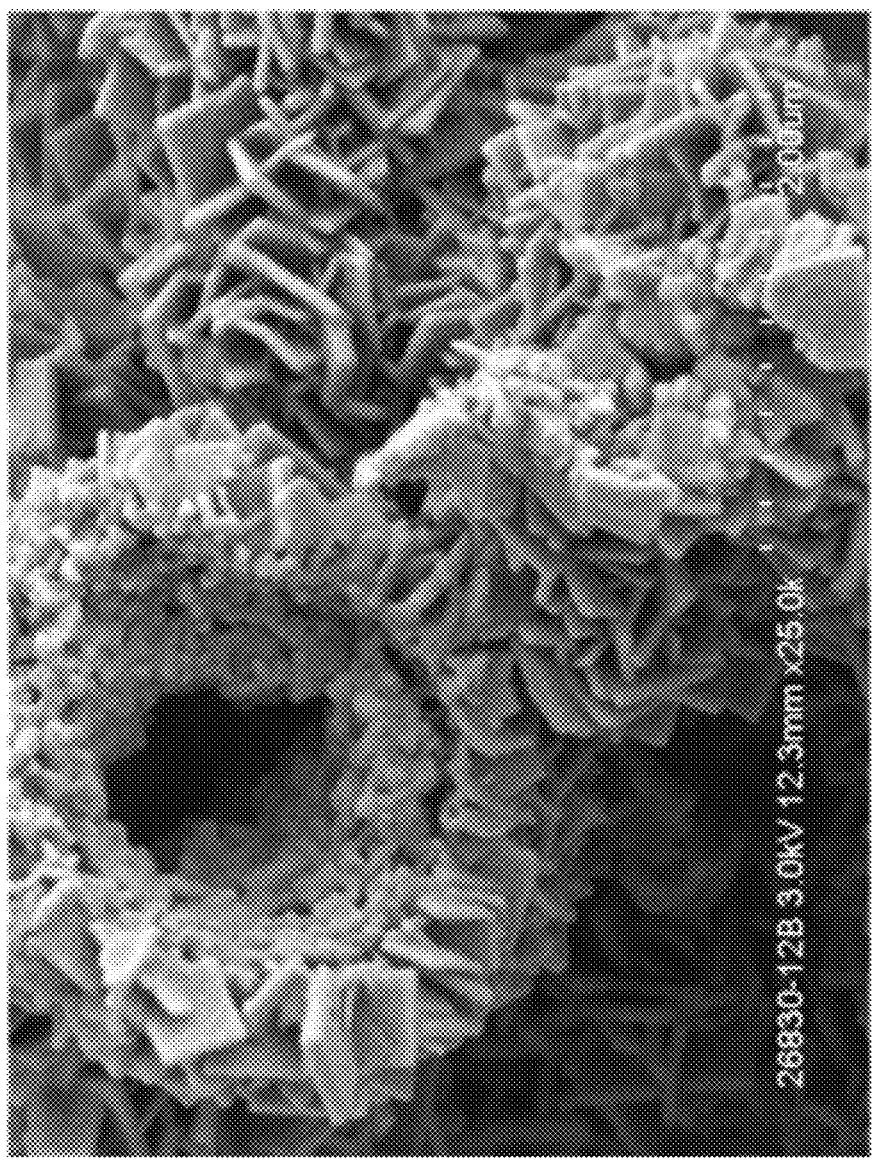
FIG. 3 shows a Scanning Electron Microscopy (SEM) image of the reaction product of a mixture of a cyanometallate and a metal oxide precursor subjected to a temperature of 600° C. for three hours.
Figure 4:
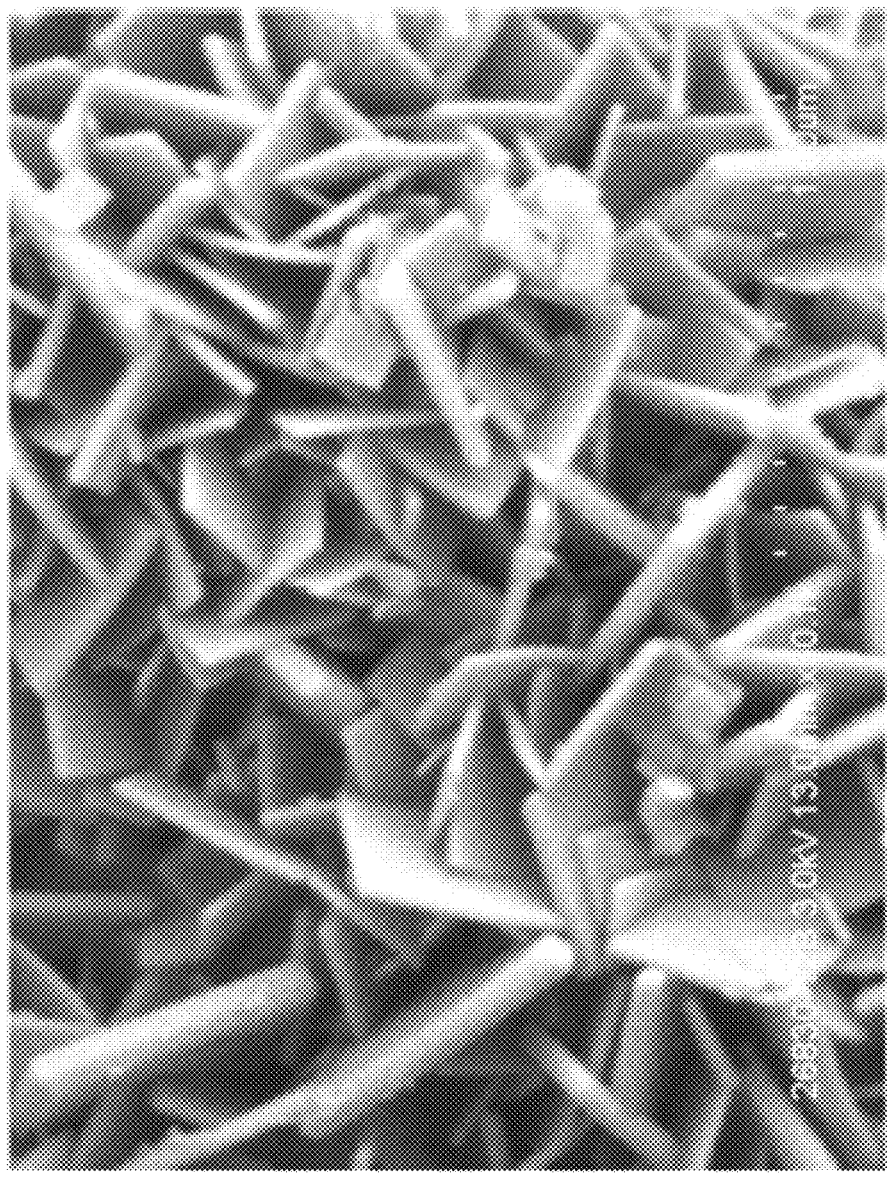
FIG. 4 shows an enlarged section of the image of FIG. 3.

H$_2$WO$_4$ (2.5 g) and a cyanogel (comprising Fe$_4$[Fe(CN)$_6$]$_3$ (1.2 g) and water (50 mL)) (giving a 1:1 molar ratio of W:Fe) were mixed together in a 250 mL beaker in a molar ratio of H$_2$WO$_4$ to Fe$_4$[Fe(CN)$_6$]$_3$ of 7:1 (giving a 1:1 molar ratio of W:Fe) to form an intimate mixture. A sample (3 g) of the resulting mixture was subjected to a temperature of 600° C. for three hour(s) under a nitrogen atmosphere to form metal nitride/carbide sample X6. A Scanning Electron Microscopy (SEM) image of sample X6 was taken showing plate-like morphology (views of the SEM image are shown in FIGS. 3 and 4).

Example 4

Figure 5:
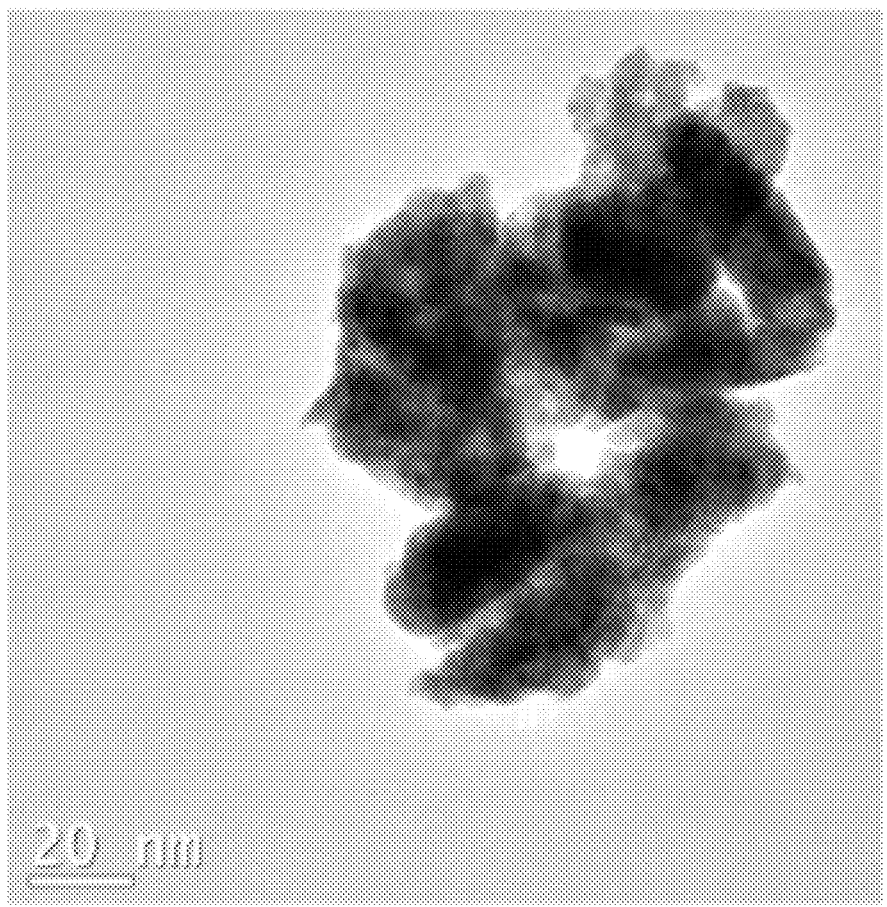
FIG. 5 shows a Transmission Electron Microscopy (TEM) image of the reaction product of a mixture of a cyanometallate and a metal oxide precursor subjected to a temperature of 600° C. for two hours.

H$_2$WO$_4$ (2.5 g) and a cyanogel (comprising Fe$_4$[Fe(CN)$_6$]$_3$ (1.2 g) and water (50 mL)) were mixed together in a 250 mL beaker in a molar ratio of H$_2$WO$_4$ to Fe$_4$[Fe(CN)$_6$]$_3$ of 7:1 (giving a 1:1 molar ratio of W:Fe) to form an intimate mixture. A sample (3 g) of the resulting mixture was subjected to a temperature of 600° C. for three hours under a nitrogen atmosphere to form metal nitride/carbide sample X7. A Transmission Electron Microscopy image of sample X7 was taken showing no apparent phase segregation (a view of the image is shown in FIG. 5).

Example 5

Samples of untreated Fe$_4$[Fe(CN)$_6$]$_3$ (P1) and H$_2$WO$_4$ (T1) were separately analysed using X-Ray Photoelectron Spectroscopy, the results of which are presented in Table 2. A further sample of $Fe_4[Fe(CN)_6]_3$ was subjected to a temperature of 600° C. for one hour to give sample P2. Sample P2 was also analysed using X-Ray Photoelectron Spectroscopy, the results of which are presented in Table 2.

$H_2WO_4$ (5 g) and $Fe_4[Fe(CN)_6]_3$ (2.4 g) were combined together by solid-solid mixing using a pestle and mortar in a molar ratio of $H_2WO_4$ to $Fe_4[Fe(CN)_6]_3$ of 7:1 (giving a 1:1 molar ratio of W:Fe) to form an intimate solid mixture. A sample (2 g) of the resulting mixture was subjected to a temperature of 350° C. for one hour under a nitrogen atmosphere to form metal nitride/carbide sample X8. A further sample (1 g) of the mixture was subjected to a temperature of 450° C. for one hour under a nitrogen atmosphere to form metal nitride/carbide sample X9. A further sample (1 g) of the mixture was subjected to a temperature of 600° C. for one hour under a nitrogen atmosphere to form metal nitride/carbide sample X10. A further sample (1 g) of the mixture was subjected to a temperature of 600° C. for two hours under a nitrogen atmosphere to form metal nitride/carbide sample X11. A further sample (1 g) of the mixture was subjected to a temperature of 600° C. for three hours under a nitrogen atmosphere to form metal nitride/carbide sample X12. A further sample (1 g) of the mixture was subjected to a temperature of 750° C. for one hour under a nitrogen atmosphere to form metal nitride/carbide sample X13. Each of samples X8 to X13 was analysed using X-Ray Photoelectron Spectroscopy, the results of which are presented in Table 2.

TABLE 2

X-Ray Photoelectron Spectroscopy analysis tracking reaction of $H_2WO_4$ and $Fe_4[Fe(CN)_6]_3$

| Sample | per 100° C. Tungsten | 34.0 eV mole % Nitride | 36.1 eV mole % Oxide |
|---|---|---|---|
| P1 | 0.0 | n/a | n/a |
| P2 | 0.0 | n/a | n/a |
| T1 | 77.1 | 0 | 100 |
| X8 | 21.2 | 0 | 100 |
| X9 | 27.7 | 0 | 100 |
| X10 | 94.8 | 56 | 44 |
| X11 | 33.9 | 10 | 90 |
| X12 | 31.7 | 14 | 86 |
| X13 | 21.4 | 52 | 48 |

The X-Ray Photoelectron Spectroscopy results presented in Table 2 demonstrate the formation of metal nitride from the mixture of the metal oxide and cyanometallate precursors as the mixture is heated. It should be noted that XPS is a surface-specific technique that gives an indication of only what material is present on the surface of a relatively small fraction of a sample. Thus, it does not give an indication of the composition of the bulk material of a sample, and therefore does not provide a quantitative estimate of the completeness or otherwise of the formation of the nitride product.

Example 6

The product of sample X6, prepared in example 3, was tested as a catalyst in cycloparaffin hydrogenolysis according to the catalyst runs set out below.

Run 1
  Sample X6 (0.2 g) and EHC-50 (API Group II base stock comprising about 80% naphthene rings and about 20% aromatic rings) (3 g) were combined and heated to 300° C. under $H_2$ pressure (900 psig, 62 barg) in an autoclave with stirring at 600 RPM for 6 hrs.

Run 2
  Sample X6 (0.2 g), ~10% $Ce/ZrO_2$ (0.2 g) and EHC-50 (API Group II base stock comprising about 80% cycloparaffin and about 20% aromatic rings) (3 g) were combined and heated to 300° C. under $H_2$ pressure (900 psig, 62 barg) in an autoclave with stirring at 600 RPM for 6 hrs.

Run 3
  Sample X6 (0.2 g), sulphated $ZrO_2$ (~2.3% S) (0.2 g) and EHC-50 (API Group II base stock comprising about 80% cycloparaffin and about 20% aromatic rings) (3 g) were combined and heated to 300° C. under $H_2$ pressure (900 psig, 62 barg) in an autoclave with stirring at 600 RPM for 6 hrs.

Run 4
  Sample X6 (0.2 g), ~15% $W/ZrO_2$ (0.2 g) and EHC-50 (API Group II base stock comprising about 80% cycloparaffin and about 20% aromatic rings) were combined and heated to 300° C. under $H_2$ pressure (900 psig, 62 barg) in an autoclave with stirring at 600 RPM for 6 hrs.

The products of runs 1 to 4 were analysed by GCMS and SFC (supercritical fluid chromatography). The data from GCMS are consistent with the SFC data in showing higher naphthenes in the feed and lower in the product. The data also showed that paraffins were higher in the product and lower in the feed. The results of the catalytic runs indicate that the X6 catalyst is effective for conversion of cycloparaffins to iso-paraffins.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

Additionally or alternately, the invention relates to:

Embodiment 1

A method for producing a metal nitride and/or a metal carbide, the method comprising:
  i) contacting at least one metal oxide comprising at least one first metal $M^1$ with a cyanometallate comprising at least one second metal $M^2$ to form a reaction mixture; and,
  ii) subjecting the reaction mixture to a temperature of at least 300° C. for a reaction period.

Embodiment 2

A method according to embodiment 1, wherein $M^1$ is a transition metal, preferably wherein $M^1$ is selected from Groups 5, 6 or 7 of the Periodic Table of the Elements.

Embodiment 3

A method according to embodiment 1 or 2, wherein $M^1$ is selected from the list consisting of: W, Re, Nb and Mo; in particular from W and Re.

Embodiment 4

A method according to any preceding embodiment, wherein the metal oxide comprises $WO_3$, in particular tungstic acid; and/or wherein the metal oxide comprises $Re_2O_7$, in particular perrhenic acid.

Embodiment 5

A method according to any preceding embodiment, wherein the cyanometallate comprises a dicyanometallate, a tetracyanometallate, a hexacyanometallate, and/or an octa-cyanometallate, preferably a tetracyanometallate and/or a hexacyanometallate.

Embodiment 6

A method according to any preceding embodiment, wherein the cyanometallate comprises a material having the formula $M^3{}_x[M^2(CN)_y]_z$, wherein $M^2$ and $M^3$ are the same or different metals, preferably wherein x is an integer from 1 to 4, preferably y is 4 or 6, and preferably z is an integer from 1 to 3, more preferably wherein x is 1, z is 1 and y is 6 or x is 4, z is 3 and y is 6.

Embodiment 7

A method according to any preceding embodiment, wherein $M^2$ is a transition metal, preferably wherein $M^2$ is selected from Groups 8 and 9 of the Periodic Table of the Elements.

Embodiment 8

A method according to any preceding embodiment, wherein $M^2$ is selected from the list consisting of Fe(II), Fe(III) and Co(III).

Embodiment 9

A method according to any one of embodiments 6 to 8, wherein $M^3$ is a transition metal, preferably wherein $M^3$ is selected from Group 3, Group 8, Group 9 or the lanthanide series of the Periodic Table of the Elements.

Embodiment 10

A method according to any one of embodiments 6 to 8, wherein $M^3$ is selected from the list consisting of K(I), Fe(III), Co(III), Y(III), Al(III), Ga(III), La(III), Pr(III) and Dy(III), preferably from the list consisting of Fe(III) and Co(III).

Embodiment 11

A method according to any preceding embodiment, wherein the cyanometallate comprises $Fe_4[Fe(CN)_6]_3$, $K_3[Fe(CN)_6]$, $Y[Fe(CN)_6]$, $Al[Fe(CN)_6]$, $La[Fe(CN)_6]$, $Pr[Fe(CN)_6]$, $Dy[Fe(CN)_6]$, $Co[Co(CN)_6]$, $Y[Co(CN)_6]$, $Al[Co(CN)_6]$, $La[Co(CN)_6]$ and/or $K_3[Co(CN)_6]$, preferably $Fe_4[Fe(CN)_6]_3$ and/or $Co[Co(CN)_6]$.

Embodiment 12

A method according to any preceding embodiment, wherein the molar ratio of metal oxide to cyanometallate in contacting step i) is from 10:1 to 1:10, preferably from 10:1 to 1:5, more preferably from 10:1 to 1:1.

Embodiment 13

A method according to any preceding embodiment, wherein the step of contacting the metal oxide with the cyanometallate to form the reaction mixture in step i) comprises forming an intimate mixture of the metal oxide and the cyanometallate, optionally in the presence of a solvent.

Embodiment 14

A method according to embodiment 13, wherein the solvent is selected from water, organic solvents and their mixtures, more preferably wherein the solvent is water.

Embodiment 15

A method according to any preceding embodiment, wherein the cyanometallate and the metal oxide are combined in the presence of a solvent and wherein the cyanometallate is provided in the form of a cyanogel that comprises a mixture of: a) the cyanometallate, and b) at least part of the solvent.

Embodiment 16

A method according to any one of embodiments 1 to 13, wherein the cyanometallate and the metal oxide are provided in solid form, and wherein contacting step i) comprises combining the metal oxide with the cyanometallate using a dry mixing method, in particular ball milling.

Embodiment 17

A method according to any preceding embodiment, wherein the reaction mixture is subjected to a temperature of at least 400° C., such as at least 500° C., in particular at least 600° C.

Embodiment 18

A method according to any preceding embodiment, wherein the reaction mixture is subjected to a temperature of from 300 to 1000° C., such as 400 to 900° C., in particular 500 to 800° C.

Embodiment 19

A method according to any preceding embodiment, wherein the reaction period is up to 48 hours, such as up to 24 hours, in particular up to 12 hours.

Embodiment 20

A method according to any preceding embodiment, wherein the reaction period is from 10 minutes to 48 hours, such as from 20 minutes to 24 hours, in particular from 30 minutes to 12 hours.

Embodiment 21

A metal nitride and/or metal carbide comprising:
a) a first metal nitride and/or carbide selected from the list consisting of: iron nitride, iron carbide, cobalt nitride and cobalt carbide; and b) a second metal nitride and/or carbide selected from the list consisting of: tungsten nitride, tungsten carbide, rhenium nitride and rhenium carbide.

Embodiment 22

A metal nitride and/or metal carbide according to embodiment 21 comprising tungsten nitride and at least one of iron nitride and iron carbide.

Embodiment 23

A metal nitride and/or metal carbide according to embodiment 21 or embodiment 22 prepared by the method according to any one of embodiments 1 to 20.

Embodiment 24

A metal nitride and/or metal carbide prepared by the method according to any one of embodiments 1 to 20.

Embodiment 25

A metal nitride and/or metal carbide according to embodiment 24, wherein the metal nitride and/or metal carbide comprises at least two different metals, in particular: a first metal $M^1$ selected from the list consisting of W, Mo, Nb and Re; and a second metal $M^2$ selected from the list consisting of Fe and Co.

Embodiment 26

A metal nitride and/or metal carbide according to embodiment 24 or embodiment 25 comprising a material selected from the list consisting of: tungsten nitride, molybdenum nitride, niobium nitride, rhenium nitride, tungsten carbide, molybdenum carbide, niobium carbide and rhenium carbide, preferably tungsten nitride and rhenium carbide.

Embodiment 27

A metal nitride and/or metal carbide according to any one of embodiments 24 to 26 comprising tungsten nitride and at least one of iron nitride and iron carbide.

Embodiment 28

A metal nitride and/or metal carbide according to any one of embodiments 21 to 27, wherein the metal nitride and/or metal carbide comprises $Fe_4N$ and wherein a Powder X-Ray Diffraction pattern of the metal nitride and/or carbide includes peaks having the following 2-theta values: 23.45, 33.36, 41.17, 47.91, 53.99, 59.64, 70.06, 75.02, 79.87, 84.65, 94.03, 98.87 and 108.52, the Powder X-Ray Diffraction pattern being collected on a diffractometer using a Cu K$\alpha$, $\lambda$=1.5405 Å, radiation source within a range of 5°≤2θ≤70° using a step size of 0.02°, a counting time of 1 s/step, a ¼ angle incident slit, 45 kv, and a current of 40 mA.

Embodiment 29

A metal nitride and/or metal carbide according to any one of embodiments 21 to 28, wherein the metal nitride and/or metal carbide comprises $Fe_3C$ and wherein a Powder X-Ray Diffraction pattern of the metal nitride and/or carbide includes peaks having the following 2-theta values: 26.19, 31.36, 33.93, 35.89, 41.78, 43.92, 47.05, 50.08, 53.89, 55.66, 59.18, 60.46, 61.80, 63.20, 67.31, 76.81, 79.87, 83.22, 86.90, 91.00 and 95.57, the Powder X-Ray Diffraction pattern being collected on a diffractometer using a Cu K$\alpha$, $\lambda$=1.5405 Å, radiation source within a range of 5°≤2θ≤70° using a step size of 0.02°, a counting time of 1 s/step, a ¼ angle incident slit, 45 kv, and a current of 40 mA.

Embodiment 30

A metal nitride and/or metal carbide according to any one of embodiments 21 to 28, wherein the metal nitride and/or metal carbide comprises $W_2N$ and wherein a Powder X-Ray Diffraction pattern of the metal nitride and/or carbide includes peaks having the following 2-theta values: 37.73, 43.85, 63.73, 76.51, 80.59, 96.68, 108.86 and 113.14, the Powder X-Ray Diffraction pattern being collected on a diffractometer using a Cu K$\alpha$, $\lambda$=1.5405 Å, radiation source within a range of 5°≤2θ≤70° using a step size of 0.02°, a counting time of is/step, a ¼ angle incident slit, 45 kv, and a current of 40 mA.

Embodiment 31

Use of the metal nitride and/or carbide of any one of embodiments 21 to 30 as a catalyst.

Embodiment 32

The use of embodiment 31, wherein the catalyst is a hydroprocessing catalyst, preferably a hydrogenation, hydrodenitrogenation and/or hydrodesulfurization catalyst.

The invention claimed is:

1. A method for producing a metal nitride and/or a metal carbide, the method comprising:
   i) contacting at least one metal oxide comprising at least one first metal $M^1$ with a cyanometallate comprising at least one second metal $M^2$ to form a reaction mixture, wherein the cyanometallate comprises a dicyanometallate, a tetracyanometallate, a hexacyanometallate, and/or an octacyanometallate; and,
   ii) subjecting the reaction mixture to a temperature of at least 300° C. for a reaction period.

2. The method according to claim 1, wherein $M^1$ is a transition metal selected from Groups 5, 6 or 7 of the Periodic Table of the Elements.

3. The method according to claim 2, wherein $M^1$ is selected from the list consisting of: W, Re, Nb and Mo.

4. The method according to claim 1, wherein the metal oxide comprises $WO_3$ and/or wherein the metal oxide comprises $Re_2O_7$.

5. The method according to claim 4, wherein the cyanometallate comprises a material having the formula $M^3_x[M^2(CN)_y]_z$, wherein $M^2$ and $M^3$ are the same or different metals, wherein x is an integer from 1 to 4, y is 4 or 6, and z is an integer from 1 to 3.

6. The method according to claim 5, wherein (i) x is 1, z is 1 and y is 6, or (ii) x is 4, z is 3, and y is 6.

7. The method according to claim 5, wherein $M^3$ is selected from the list consisting of K(I), Fe(III), Co(III), Y(III), Al(III), Ga(III), La(III), Pr(III) and Dy(III).

8. The method according to claim 5, wherein $M^3$ is selected from the list consisting of Fe(III) and Co(III).

9. The method according to claim 1, wherein the cyanometallate is a tetracyanometallate and/or a hexacyanometallate.

10. The method according to claim 1, wherein $M^2$ is a transition metal selected from Groups 8 and 9 of the Periodic Table of the Elements.

11. The method according to claim 1, wherein $M^2$ is selected from the list consisting of Fe(II), Fe(III) and Co(III).

12. The method according to claim 1, wherein the cyanometallate comprises $Fe_4[Fe(CN)_6]_3$, $K_3[Fe(CN)_6]$, $Y[Fe(CN)_6]$, $Al[Fe(CN)_6]$, $La[Fe(CN)_6]$, $Pr[Fe(CN)_6]$, $Dy[Fe(CN)_6]$, $Co[Co(CN)_6]$, $Y[Co(CN)_6]$, $Al[Co(CN)_6]$, $La[Co(CN)_6]$ and/or $K_3[Co(CN)_6]$.

13. The method according to claim 1, wherein the cyanometallate comprises $Fe_4[Fe(CN)_6]_3$ and/or $Co[Co(CN)_6]$.

14. The method according claim 1, wherein the molar ratio of metal oxide to cyanometallate in contacting step i) is from 10:1 to 1:10.

15. The method according to claim 1, wherein the cyanometallate and the metal oxide are combined in the presence of a solvent and wherein the cyanometallate is provided in the form of a cyanogel that comprises a mixture of: a) the cyanometallate, and b) at least part of the solvent.

16. The method according to claim 1, wherein the cyanometallate and the metal oxide are provided in solid form, and wherein contacting step i) comprises combining the metal oxide with the cyanometallate using a dry mixing method.

17. The method according to claim 1, wherein the reaction mixture is subjected to a temperature of from 300 to 1000° C. for a reaction period of from 10 minutes to 48 hours.

18. A method, comprising:
    contacting a catalyst, hydrocarbon feedstock, and hydrogen under hydroprocessing, hydrogenation, hydrodenitrogenation and/or hydrodesulfurization conditions, wherein the catalyst includes,
        a first metal nitride and/or carbide selected from the list consisting of iron nitride, iron carbide, cobalt nitride and cobalt carbide, and
        a second metal nitride and/or carbide selected from the list consisting of tungsten nitride, tungsten carbide, rhenium nitride and rhenium carbide.

* * * * *